United States Patent
Magner et al.

(10) Patent No.: US 11,736,600 B2
(45) Date of Patent: Aug. 22, 2023

(54) PROTECTIVE BAG AND DISPENSER TO MAKE MOBILE DEVICES MORE HYGIENIC

(71) Applicant: MOBILE GUARD RX, LLC, San Diego, CA (US)

(72) Inventors: Daniel Magner, Simpsonville, SC (US); Siddharth Chhokar, San Diego, CA (US); Derek King, San Diego, CA (US)

(73) Assignee: Mobile Guard RX, LLC, San Diego, CA (US)

( * ) Notice: Subject to any disclaimer, the term of this patent is extended or adjusted under 35 U.S.C. 154(b) by 151 days.

(21) Appl. No.: 17/304,456

(22) Filed: Jun. 21, 2021

(65) Prior Publication Data

US 2021/0314432 A1 Oct. 7, 2021

Related U.S. Application Data

(63) Continuation of application No. 16/516,118, filed on Jul. 18, 2019, now Pat. No. 11,044,355.

(60) Provisional application No. 62/700,179, filed on Jul. 18, 2018.

(51) Int. Cl.
| | |
|---|---|
| *H04M 1/17* | (2006.01) |
| *H04B 1/3888* | (2015.01) |
| *H01H 9/02* | (2006.01) |
| *B65D 33/16* | (2006.01) |
| *B65D 83/08* | (2006.01) |

(52) U.S. Cl.
CPC .......... *H04M 1/17* (2013.01); *B65D 33/1691* (2013.01); *B65D 83/0835* (2013.01); *H01H 9/0242* (2013.01); *H04B 1/3888* (2013.01); *H01H 2223/003* (2013.01); *H01H 2239/062* (2013.01)

(58) Field of Classification Search
CPC . H04M 1/17; B65D 33/1691; B65D 83/0835; B65D 33/002; B65D 33/001; H01H 9/0242; H01H 2223/003; H01H 2239/062; H04B 1/3888; H04B 2001/3894
See application file for complete search history.

(56) References Cited

U.S. PATENT DOCUMENTS

| | | | |
|---|---|---|---|
| 5,944,432 A | 8/1999 | Richardson | |
| 5,950,818 A | 9/1999 | Paulsen | |
| 6,273,252 B1 | 8/2001 | Mitchell | |
| D595,052 S | 6/2009 | Rohrbach et al. | |
| 8,605,892 B1 | 12/2013 | Owens et al. | |
| 9,550,620 B2 | 1/2017 | Naor | |
| 9,850,034 B2 * | 12/2017 | Tan | B65D 31/10 |
| 9,912,366 B2 | 3/2018 | Sullivan | |
| 2002/0160896 A1 | 10/2002 | Yeh | |

(Continued)

FOREIGN PATENT DOCUMENTS

| | | |
|---|---|---|
| FR | 2762955 A1 | 11/1998 |
| GB | 2332189 | 6/1999 |

(Continued)

*Primary Examiner* — Tuan D Nguyen
(74) *Attorney, Agent, or Firm* — Knobbe Martens Olson & Bear, LLP

(57) ABSTRACT

A protective bag into which a mobile device can be placed to limit exposure of the device to unsanitary conditions or conversely to limit exposure of other surfaces to an unsanitary mobile device. The protective bags are distributed to users using a dispenser. The system improves overall hygiene associated with use of mobile devices.

12 Claims, 12 Drawing Sheets

(56) References Cited

U.S. PATENT DOCUMENTS

| | | |
|---|---|---|
| 2005/0220368 A1 | 10/2005 | Kohn |
| 2007/0045148 A1* | 3/2007 | Saclier ............... B65D 75/5805 |
| | | 206/499 |
| 2016/0068327 A1 | 3/2016 | Fuentes |
| 2016/0124912 A1 | 8/2016 | Clarkson |
| 2018/0194539 A1* | 7/2018 | Ma ........................ A61B 42/40 |

FOREIGN PATENT DOCUMENTS

| | | |
|---|---|---|
| KR | 20-2011-0001900 | 2/2011 |
| KR | 101168293 B1 | 7/2012 |
| WO | WO 2016/124912 A1 | 8/2016 |

* cited by examiner

PROTECTIVE BAG AND DISPENSER TO MAKE MOBILE DEVICES MORE HYGIENIC

PRIORITY

This application is a continuation application of U.S. patent application Ser. No. 16/516,118, filed Jul. 18, 2019, and entitled "A PROTECTIVE BAG AND DISPENSER TO MAKE MOBILE DEVICES MORE HYGIENIC," which claims benefit under 35 U.S.C. 119(e) to U.S. Provisional Patent Application No. 62/700,179, filed Jul. 18, 2018, the entire disclosures of which are hereby incorporated by reference herein in their entirety. Any and all priority claims identified in the Application Data Sheet, or any corrections thereto, are hereby incorporated by reference under 37 CFR 1.57.

FIELD

This invention generally relates to hygienic protective measures for mobile devices.

BACKGROUND

People currently carry mobile devices during their daily activities. These devices are infrequently cleaned but frequently contaminated and used in nonhygienic situations. Protective cases are commonly used but these protective cases are primarily designed to reduce the chance of breakage or malfunction from liquids or impacts. Commonly, these protective cases become a semi-permanent part of the mobile devices. However, protective cases do not reduce contamination of mobile devices. Moreover, they do not insulate or protect other people from exposure to already contaminated mobile devices.

SUMMARY

Current approaches for making mobile devices more hygienic focus on cleaning and sterilizing. U.S. Pat. Pub. No. 2015/0143648A1 describes a pouch coated with a cleaning substance into which a mobile device can be inserted and then removed, primarily removing marks from the touch-sensitive screen. U.S. Pat. No. 9,392,853 describes a carrying case that cleans and disinfects a device with a pad and cleaning agent each time the device is removed from the case. U.S. Pat. Pub. No. 2013/0063922 describes a sterilization compartment into which a personal electronic device is placed and then sterilized by irradiation with ultra-violet light. U.S. Pat. No. 9,912,316 describes a wearable mobile phone glove that encases a mobile phone in a garment attached to an individual, and protects the mobile phone from the elements. U.S. Pat. No. 9,550,620 describes a pre-sterilized cover for mobile devices. U.S. Pat. No. 8,605,892 describes an antimicrobial covering for corded devices. U.S. Pat. No. 6,273,252 describes a sealable bag rendering mobile devices water impermeable. Korean Pat. No. KR101168293 describes a water-repellant pouch for electronic devices. Korean Pat. No. KR2020110001900 describes a plastic bag covering for a phone to protect it from moisture and dust. French Pat. No. FR2762955 describes a pre-sterilized cover for remote control units.

One aspect of the present disclosure is the realization that a protective bag can be placed over a mobile device to protect that mobile device from contamination or to otherwise make the mobile device more hygienic. These protective bags can be easily replaceable so that a fresh bag can be placed on the mobile device and/or a contaminated bag removed and discarded. The protective bags can be sized and shaped to encompass the mobile device. The protective bag can include an opening through which the mobile device can be received into an interior of the protected bag. The opening can be closeable by a user. The protective bag limits the exposure of the mobile device to nonhygienic conditions and otherwise maintains the surfaces in a hygienic state. Notably, the hygienic improvements afforded by the protective bag need not rise to the level of medically sterile surfaces. Simply improving the overall hygienic state of the mobile device can be accomplished using the protective bag.

Another aspect of the present disclosure is a system for dispensing the protective bags. The dispenser system can be placed in convenient locations where users may want to provide protection for their mobile devices. Example locations can be entry and exits to hospitals, surgical rooms, doctor's offices, schools, restaurants, public transportation, and many other locations where mobile devices can be exposed to nonhygienic conditions or where nonhygienic devices can contaminate more hygienic locations. Accordingly, the dispensing system can contain a plurality of protective bags that can be dispensed in a way that facilitates placing them on a mobile device.

Another aspect of the present disclosure are dispensing systems that limit exposure of the protective bags before they are accessed by a user for use in conjunction with the mobile device. The dispensing system can facilitate dispensing a single protective bag to a user. The dispensing system can substantially prevent contamination of more than one of the protective bags contained within the dispensing system. The dispensing system can substantially protect the protective bags contained within the dispensing system from unnecessary handling or contamination by a user except for at least one protective bag that is presented to the user for withdrawal from the system.

Another aspect of the present disclosure is a dispenser system for dispensing a roll of protective bags for protecting a mobile device. The system can include a dispenser housing with a plurality of panels enclosing an interior space. The interior space is sized and shaped to house the roll of protective bags and each of the protective bags of the roll have a width and a length, the plurality of panels including a front panel. A slot disposed in the front panel and has a widened portion and a lateral portion. The widened portion has a width equal to or greater than the width of the protective bags of the roll. The lateral portion is sized and shaped to allow a user to retrieve a protective bag from the roll of protective bags through the slot. The lateral portion intersects the widened portion at one or more corners. The one or more corners are sized and shaped to facilitate opening the retrieved protective bag from the roll of protective bags. An external shelf extends from the dispenser housing at a distance below the slot. The distance is equal to or less than the length of each of the protective bags of the roll so that the external shelf supports the retrieved protective bag when the mobile device is disposed in the retrieved protective bag and the protective bag is connected to the roll.

Another aspect of the present disclosure is a dispenser system for dispensing a protective bag for a mobile device. The system can include a cylindrical container with a plurality of protective bags and a slot for dispensing the plurality of protective bags. A first mounting portion and a second mounting portion can be included. Each of the mounting portions include a plurality of extensions. Each extension of the plurality of extensions is sized to engage with the cylindrical container to support the cylindrical container between the first and second mounting portions. The slot is oriented to be exposed between the pluralities of extensions.

Another aspect of the present disclosure is a dispenser system for dispensing a protective bag for use with a mobile device. The dispenser system includes a dispenser housing. The housing has a plurality of panels for supporting the protective bag and a slot for dispensing the protective bag. The protective bag is sized to receive the mobile device and is closable to protect the mobile device from unhygienic conditions.

DRAWINGS

DETAILED DESCRIPTION

The following detailed description is directed to certain specific embodiments. The invention(s) disclosed herein, however, can be embodied in a multitude of different ways as defined and covered by the claims. In this description, reference is made to the drawings, wherein like parts are designated with like numerals throughout. The features, aspects and advantages of the present invention will now be described with reference to the drawings of several embodiments that are intended to be within the scope of the development herein disclosed. These and other embodiments will become readily apparent to those skilled in the art from the following detailed description of the embodiments having reference to the attached figures, the invention not being limited to any particular embodiment(s) herein disclosed.

Figure 1:
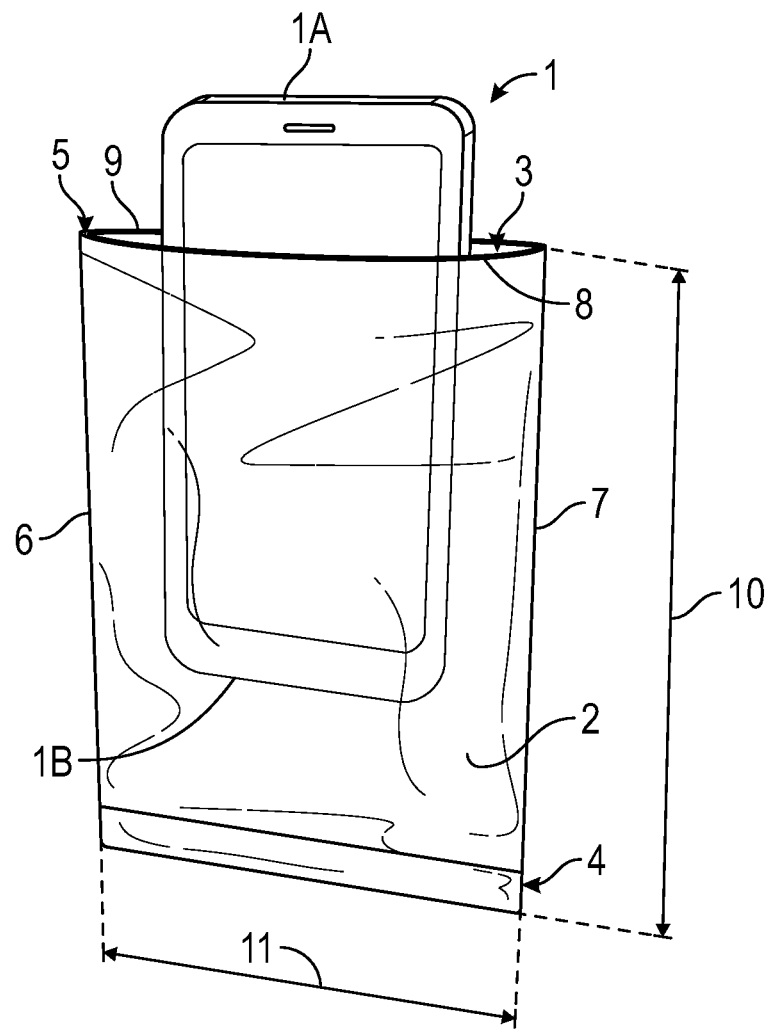
FIG. 1 is a perspective view of a mobile device partially inserted into a protective bag according to a preferred embodiment of the present invention.

FIG. 1 shows a mobile device 1. The mobile device 1 can be any conventionally known mobile device such as a cordless phone, smart phone, cell phone, tablet, or other handheld computer. In certain implementations, the mobile device 1 can have a touch screen. The touch screen can be capacitance or resistance based. The mobile device 1 can have various dimensions. In certain implementations, the mobile device 1 can be generally rectangularly shaped. For example, the mobile device 1 can have a width between approximately 2" and 5". The mobile device 1 may have a length between 4" and 7". The mobile device 1 can have a thickness between ⅛" and ¾". These dimensions are exemplary only and in no way limiting unless specifically included in the claims.

The mobile device 1 can include a front panel 1A. The mobile device 1 can include a rear panel 1B. The front and/or rear panels 1A or 1B can include the touch screen. The mobile device 1 can optionally be used in conjunction with a protective case. For example, the protective case can fit around an outer perimeter and permanently, semi-permanently or temporarily attach with the outer perimeter of the mobile device 1. The protective case can provide impact protection, dust protection, and/or liquid protection. However, a protective case provides little to no protection against hygienic contamination such as bacteria, viruses, dirt, liquids, and other contaminants that can adhere to the exterior surfaces of the mobile device 1 and/or the protective case. Moreover, a protective case is not disposable. Accordingly, it can be advantageous to use the mobile device 1 in conjunction with a disposable hygienic or protective bag 2. The protective bag 2 can further differ from the conventional protective case in that the protective bag 2 is only temporarily attached around the mobile device 1.

The protective bag 2 can include a lower end 4, an upper end 5, and/or first and second sides 6, 7. The protective bag 2 can include a front layer 8 and a rear layer 9. The layers 8, 9 can be formed out of a plastic or other polymer, a natural or synthetic fiber or fabric, a paper or wood pulp product, metallic or metallic like materials, glass, or glass-like materials, or any combination of these or other suitable materials.

The front and rear layers 8, 9 can be attached to each other along the first and second sides 6, 7 and/or the lower end 4. The front and rear layers 8, 9 can be continuous, or attached to each other through heat sealing, adhesives, or other connection means. The protective bag 2 can generally form a rectangular shape. The protective bag 2 can have dimensions that are sized to receive a mobile device of a specific size or size range. The protective bag 2 can include a width 11 and a height 10. The height 10 can extend between the lower end 4 and the upper end 5. The width 11 can extend between the first side 6 and the second side 7. In certain embodiments, the width 11 can be between 2" and 6". In certain embodiments, the height 10 can be between 4" and 7". These dimensions are exemplary only and in no way limiting unless specifically included in the claims.

The upper end 5 can include an opening 3 into an interior between the front and back layers 8, 9. The opening 3 can be sized to receive the mobile device 1 in one or more orientations. In one implementation, the opening 3 can extend from the first side 6 to the second side 7. In other implementations, the opening 3 can be narrower than the width 11. The opening 3 can be closable. The opening 3 can be closable by channel—lip connection (e.g., ziploc), folding, stapling, the addition of an adhesive, heating, or any combination of these methods or other suitable closure mechanisms.

In certain implementations, the protective bag 2 facilitates use of the mobile device 1 contained within the protective bag 2. For example, the material of the protective bag 2 can allow buttons and touch screens to function through the front layer 8 and/or rear layer 9. The material of the layers 8, 9 of the protective bag 2 can be translucent, opaque, or have varying degrees of opacity. In one implementation, the front layer 8 can be more translucent than the rear layer 9. This can facilitate, for example, use of the mobile device 1 and/or touch screen thereof while contained within the protective bag 2. In certain other implementations of the protective bag 2, the material thereof can be of a thickness, opacity, durability, and/or material that hinders one or more of the functionalities of the mobile device such as the touch screen response, wireless charging, and/or buttons or cameras.

Figure 2:
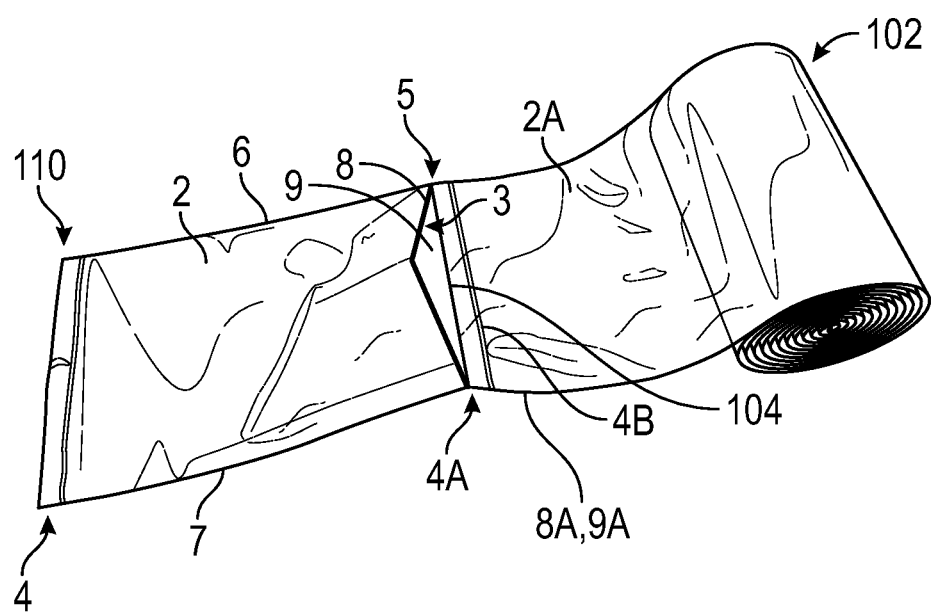
FIG. 2 is a perspective view of a plurality of the protective bags from FIG. 1 in a roll.

FIG. 2 shows a roll 102. The roll 102 can contain a plurality of protective bags, such as the protective bag 2 described above. Each of the plurality of protective bags in the roll 102 can be connected to one or more adjacent protective bags in a successive string formed into the roll 102. The roll 102 can include a free end 110. In some implementations, the roll 102 can comprise 10, 20, 50, 100, 200, or more protective bags.

FIG. 2 shows the free end 110 of the protective bag 2. The protective bag 2 can be connected to the next adjacent protective bag 2A on the roll 102. The protective bag 2A can be connected at the upper end 5 with a lower end 4A of the adjacent protective bag 2A. The connection between the upper end 5 and the lower end 4A can be at a perforation line 104. The perforation line 104 can be a perforated line or series of perforations in the rear layer 9 of the protective bag 2 and a rear layer 9A of the adjacent protective bag 2A. The perforation line 104 can also be a perforated line or a series of perforations in the front layer 8 and the rear layer 9 of the protective bag 2. The perforation line 104 can be adjacent to a heat seal line 4B closing the lower end 4A of the protective bag 2A.

The front layer 8 can be connected with a front layer 8A of the adjacent protective bag 2A. This connection can be a perforated line 104. However, in other implementations, the connection between the front layer 8 and the front layer 8A can be precut or preopened to create the opening 3 without intervention by a user. In other implementations, the user can tear the perforation between the front layer 8 and the front layer 8A to form the opening 3. In other implementations, the user can tear protective bag 2 from 2A before opening the protective bag.

Figure 3:
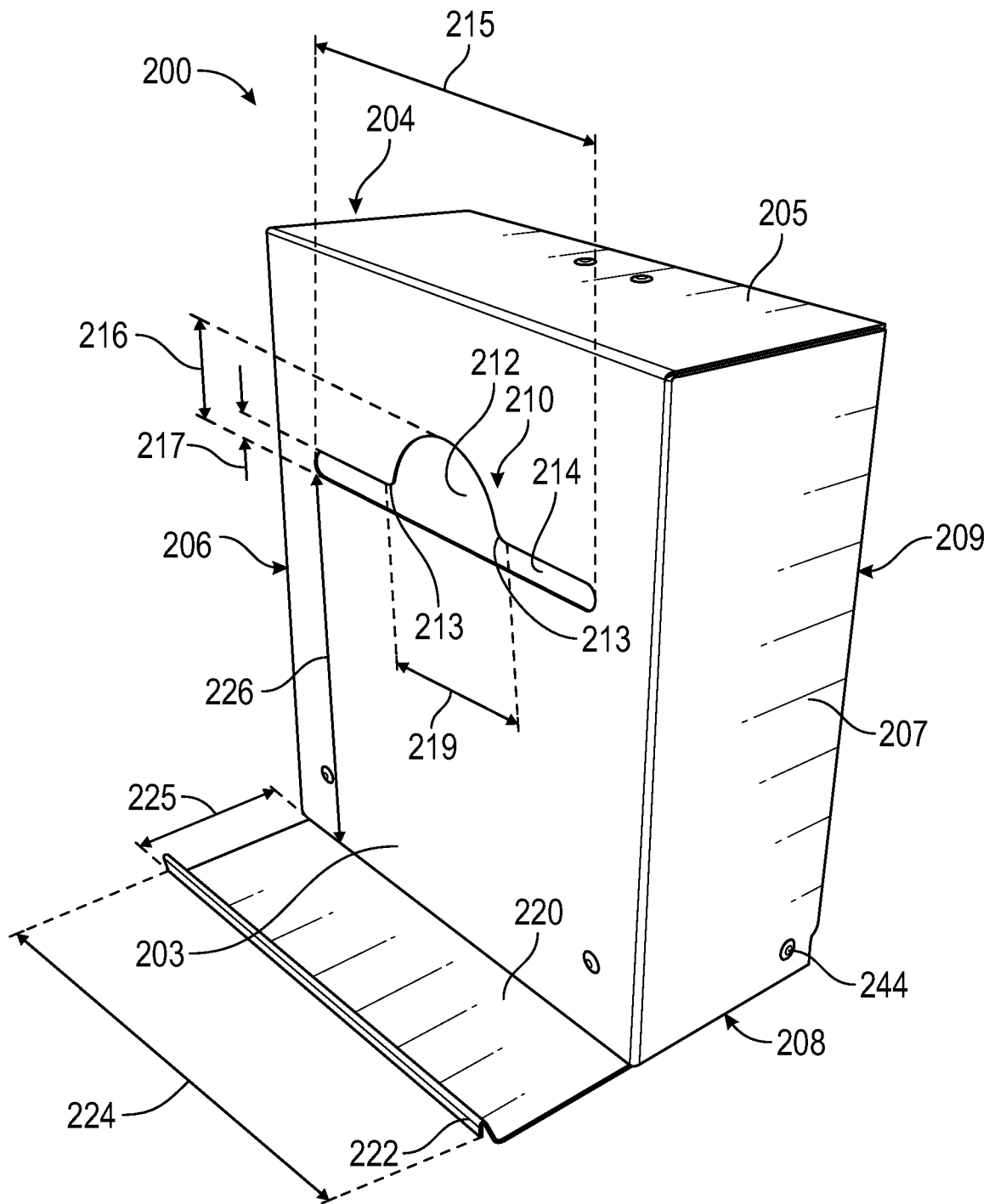
FIG. 3 is a front perspective view of a dispensing system for use with the roll of protective bags of FIG. 2.

FIG. 3 shows a dispenser 200. The dispenser 200 can be used in conjunction with the roll 102 of the protective bags 2. The dispenser 200 can include a housing 204. The housing 204 can be formed of any suitable material such as, but not limited to, plastic or other polymer, metal, paper or wood pulp products, glass or glass-like materials, or other suitable materials. The housing 204 can take various shapes and forms, such as the shapes shown in later embodiments of the dispensers described below. The housing 204 of the dispenser 200 can form an enclosure. The enclosure can be sized and shaped to contain a plurality of protective bags in a stack or roll 102.

The housing 204 of the dispenser 200 can include a generally rectangular shape. The housing 204 can include a front panel 203. The housing 204 can include a top panel 205, a bottom panel 208, a first side 206, a second side 207, and/or a back side 209. In certain implementations, the housing 204 can be openable by removal or articulation of any of the panels of the housing 204.

The front panel 203 can be generally planar. The front panel 203 can include a slot 210. The slot 210 can extend through the front panel 203 of the housing 204 into the enclosure contained within the housing 204. The slot 210 can include a lateral portion 212 and/or a widened portion 214. The lateral portion 212 can be connected with the widened portion 214 to form a single aperture within the front panel 203.

The slot 210 can have an overall height 216. The overall height 216 can be approximately 1". In certain other implementations, the height 216 can be between 1/4" and 2". The widened portion 214 can have a height 217. In certain implementations, the height 217 can be approximately ¼". In certain other implementations, the height 217 can be between ⅛" and 1". The widened portion 214 including the lateral portion 212 can have a width 215. The width 215 can correspond to the width 11 of the protective bag 2. The width 215 can be greater than or equal to the width 11 of the protective bag 2. Accordingly, the width 215 in some implementations can be between 2" and 6". The lateral portion 212 can have a width 219. The width 219 can be approximately 2". In certain other implementations, the width 219 can be between 1" and 4". The lateral portion 212 can have a height measured from the top of the widened portion 214. The height can be the difference between the height 216 and the height 217 of the widened portion 214. The lateral portion 212 can be centered along the width 215 of the widened portion 214. The lateral portion 212 can have an arc shape. The lateral portion 212 can join the widened portion 214 at one or more corners 213. The corners 213 can be located at opposite ends of the lateral portion 212.

The housing 204 can include a shelf 220. The shelf 220 is used to support the mobile device 1 when it is being placed inside of the protective bag 2. The shelf 220 can be used to place the mobile device 1 within the protected bag 2 before, during or after the protective bag 2 is dispensed through the slot 210 and/or separated from the roll 102. The shelf 220 can be located at any point on the housing 204. The shelf 220 can be connected with the front panel 203, the bottom panel 208, the top panel 205, and/or any of the other portions of the housing 204. The shelf 220 can extend perpendicularly from the housing 204. The shelf 220 can include an outer flange or lip 222. The outer flange or lip 222 can extend in a generally perpendicular direction from the shelf 220. In certain implementations, the shelf 220 can be generally planar. The shelf 220 can have a depth 225. The depth 225 can be approximately 2". In other implementations, the depth 225 can be between approximately 0.5" and 4.0". The shelf 220 can have a width 224. The width 224 an be greater than or equal to a width of the mobile device 1, the width 11 of the protective bag 2, and/or the width of the front panel 203, or the width of the housing 204. In certain implementations, the width 224 can be 7". The width 224 in other implementations can be between 2" and 9".

The shelf 220 can be coupled with the housing 204 at an intersection between the front panel 203 and the bottom panel 208. The shelf 220 can be located a distance 226 below the slot 210. The distance 226 can be approximately 5". In other implementations, the distance 226 can be between approximately 4" and 8". In certain implementations, the distance 226 can be approximately equivalent to the length 10 of the protective bag 2. In certain implementations, the distance 226 can be greater than the length 10 of the protective bag 2. In certain implementations, the distance 226 can be less than the length 10 of the protective bag 2. The distance 226 provides the advantage of supporting the protective bag 2 when the protective bag 2 is still connected at the free end 110 of the roll 102 (e.g., during dispensing through the slot 210). This can facilitate a user opening the protective bag 2 at the opening 3 and inserting the mobile device 1 between the front and rear layers 8, 9. The mobile device 1 can easily rest on the shelf 220 while the opening 3 is manipulated by a user. The shelf 220 can also support the mobile device 1 within the protective bag 2 while a user closes the opening 3. This functionality of the shelf 220 is further shown in FIGS. 5 and 6.

Figure 4:
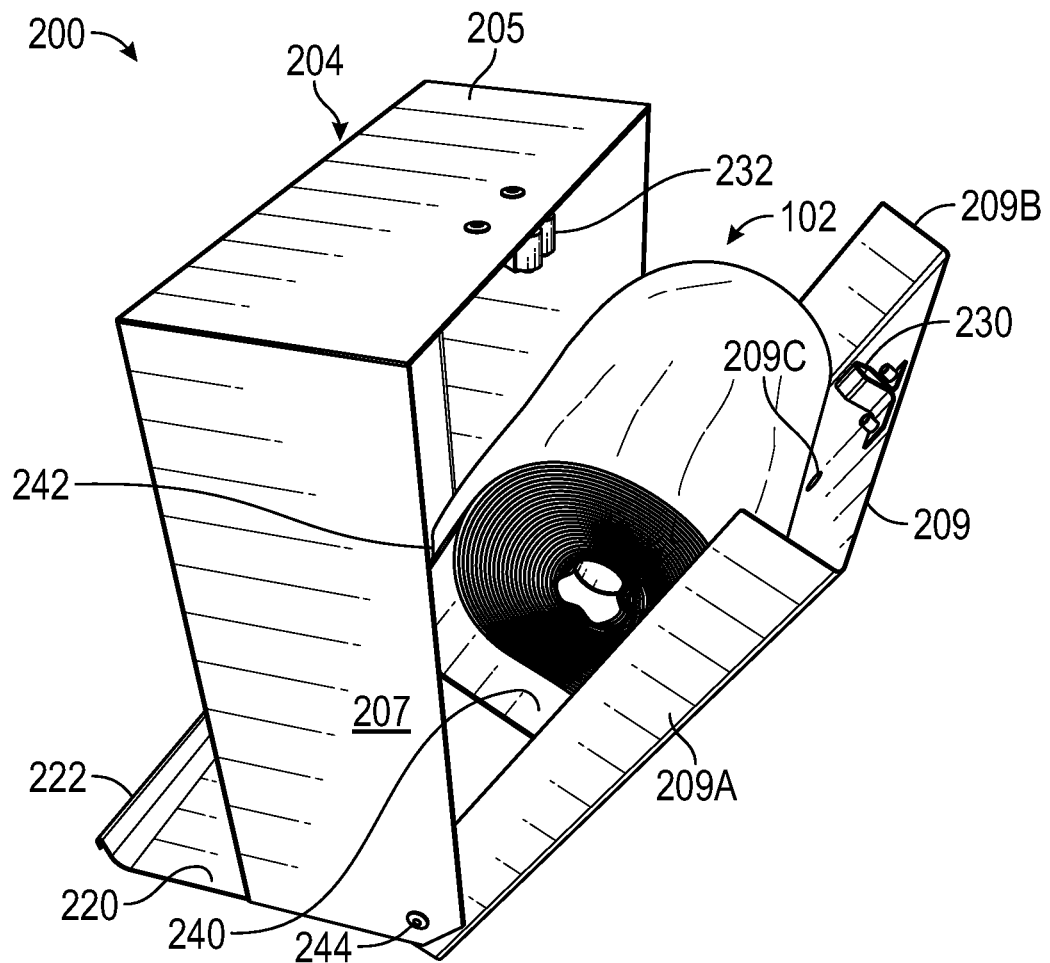
FIG. 4 is a rear perspective view of the dispensing system of FIG. 3 in an open configuration showing the roll of protective bags of FIG. 2 disposed therein.

FIG. 4 shows the rear panel 209 of the housing 204 opened to reveal an interior of the housing 204. The interior of the housing 204 can include an internal shelf 240. The internal shelf 240 can be generally aligned below or at the slot 210. The internal shelf 240 supports the roll 102. The internal shelf 240 can generally align the free end 110 of the roll 102 with the slot 210 for dispensing the plurality of protective bags. The internal shelf 240 can include a flange or lip 242. The lip 242 can help position the roll 102 on the internal shelf 240.

The back panel 209 can include various features for facilitating opening the housing 204. The back panel 209 can include first and second wing panels 209A, 209B. The rear panel 209 can be hingedly connected with the housing 204 at one or more pivot locations 244 (e.g., rivets, hinges, or similar). The rear panel 209 can include a clasp mechanism 230. The clasp mechanism 230 can interact and temporarily link or join or couple with the corresponding coupling mechanisms 232 on the rest of the housing 204. In one implementation, the coupling mechanism 232 can comprise a grip mechanism for gripping a projection on the clasp mechanism 230. In other implementations of the housing 204, any of the other panels of the housing 204 can be openable.

Figure 5:
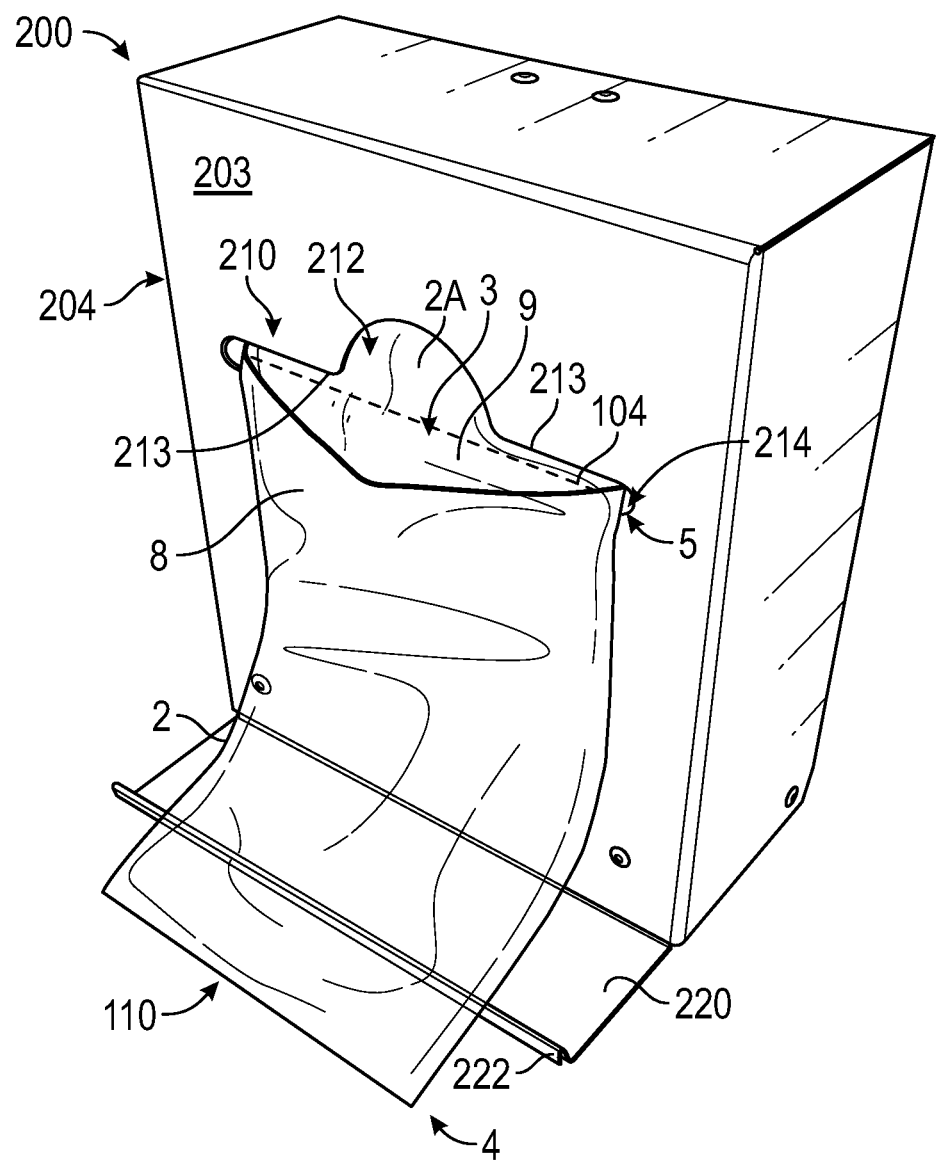
FIG. 5 is a perspective view of the dispensing system of FIG. 3 in a closed configuration showing a bag from the roll of protective bags of FIG. 2 passing through a slot in a front panel of the dispensing system.
Figure 6:
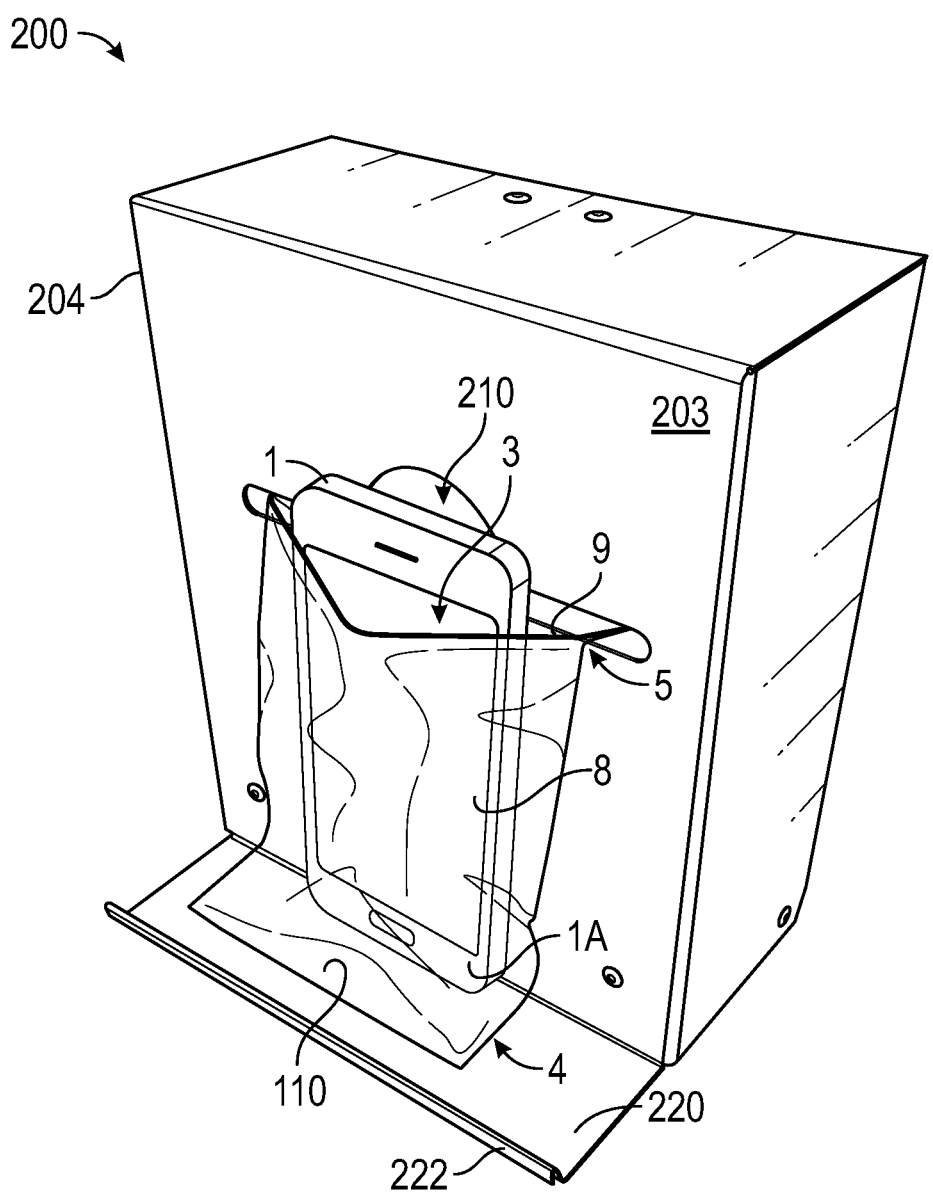
FIG. 6 shows the dispensing system of FIG. 5 in use with a mobile device.

As shown further in FIGS. 5 and 6, the free end 110 of the roll 102 is dispensed through the slot 210. Specifically, the free end 110 can fit through the widened portion 214 of the slot 210. The width 215 of the widened portion 214 can be approximately equal or greater than the width 11 of the protective bag 2. This can advantageously minimize deformation and other damage to the protective bag 2 as it is dispensed through the slot 210. This can be particularly important where the protective bag 2 contains a translucent material and/or is intended to facilitate operation of the mobile device contained therein. Damage, crinkling or other marring of the protective bag 2 can have a detrimental effect to the operability of the mobile device 1 as contained within the protective bag 2.

The slot 210 is shaped to facilitate opening the protective bag 2 to insert the mobile device 1. The lateral portion 212 of the slot 210 is shaped to facilitate a user inserting an object, such as the user's fingers, to grasp the front layer 8 and open the opening 3 by moving the front layer 8 away from the rear layer 9. The lateral portion 212 gives the user room to reach in and grab the front layer 8. The corners 213 can press against the rear layer 9 to separate the front later 9 and allow widening of the opening 3. The corners 213 can be generally pointed to increase the frictional engagement with the rear layer 9. Advantageously this can prevent the user from removing more than a single dispensing protective bag 2 through the slot 210 at a time. In certain implementations, the corners 213 can be sharpened and to include a serrated edge for engagement with the rear panel 9.

The slot 210 can also facilitate separating the protective bag 2 at the free end 110 from the adjacent protective bag 2A (i.e., while still contained within the housing 204). In certain implementations, the shelf 220 and/or the slot 210 can include a sharpened or serrated edge for separating the protective bag 2 from the adjacent protective bag 2A. The widened portion 214 of the slot 210 can include a serrated edge along a lower end thereof. This can facilitate either tearing along the perforated line 104 and/or tearing of the rear layer 9 or rear layer 9A.

The protective bag 2 and the material it is made out of can be disposable. In certain implementations such as outside of a bathroom, the user can retrieve a protective bag 2 from the dispensing unit 200 to protect their phone while using the bathroom and then flush the protective bag 2 down the toilet. Accordingly, the material of the protective bag 2 can be biodegradable.

The rear panel 209 can include one or more mounting locations 209C. The mounting locations or apertures 209C can facilitate installation of the dispensing unit 200 on a wall, post, or other upright structure. In other implementations, the mounting locations 209C can be on any of the other panels of the housing 204, depending on the desired location of installation and the desired position of the dispenser 200 in the location.

Figure 7:
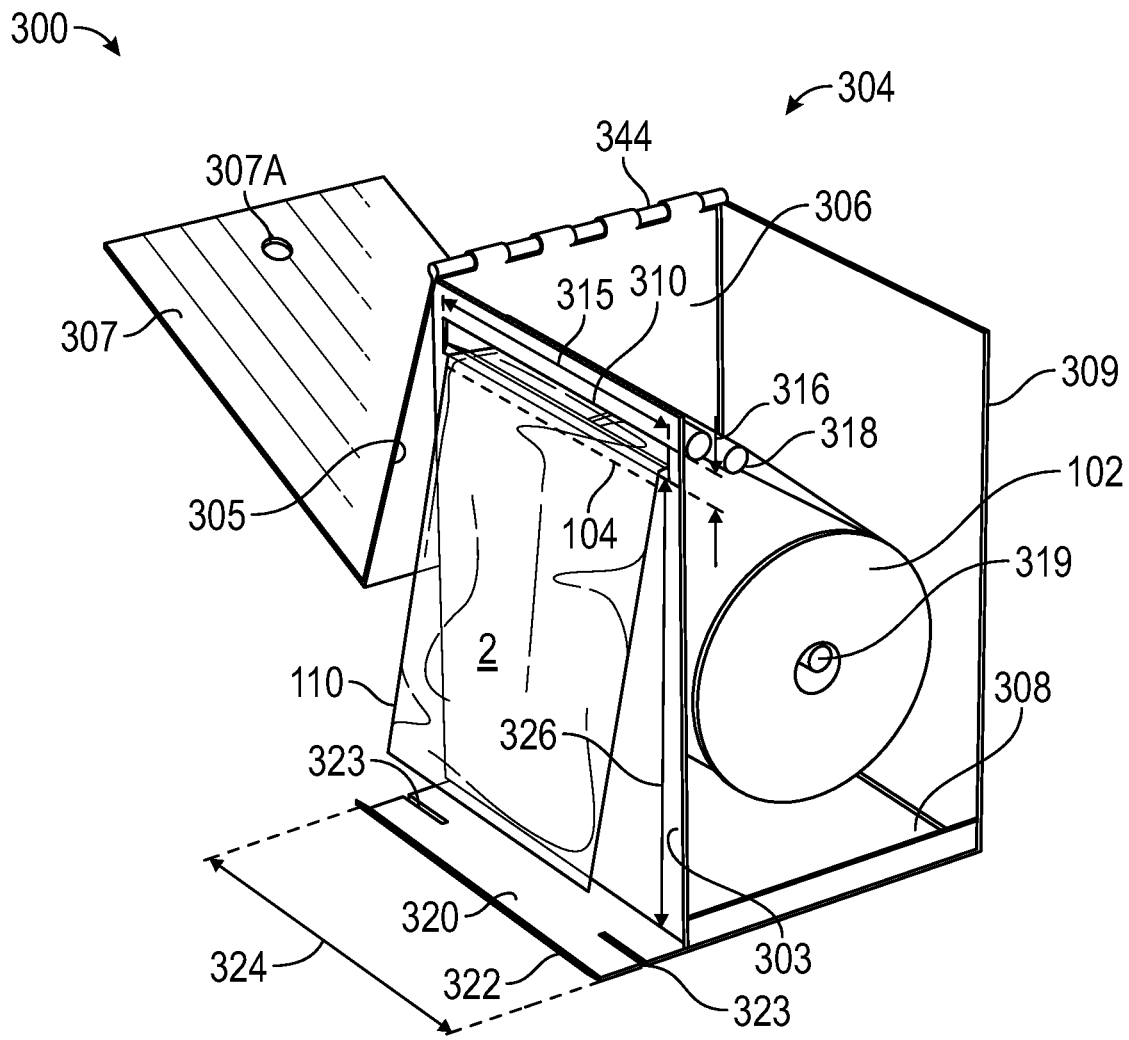
FIG. 7 shows a dispensing system according to another preferred embodiment of the present invention.

FIG. 7 shows another embodiment of a dispenser 300 similar to the dispenser 200. The dispenser 300 can be used for dispensing the roll 102 of the plurality of protective bags. The dispenser 300 can include a housing 304. The housing 304 can include front panel 303, rear panel 309, top panel 305, bottom panel 308, first side panel 306, and/or second side panel 307. In certain implementations, the housing 304 can be formed as a rectangular box, although this is not required. The housing 304 can form an enclosure. The enclosure can include a mount for the roll 102. The housing 304 can include a spindle 319. The spindle 319 can be fixed and serve as a mounting location for the roll 102. The housing 304 can comprise one or more guides or rollers 318. The guides or rollers 318 can guide the free end 110 of the roll 102 through a slot 310. The guides or rollers 318 can be generally aligned with the slot 310. The guides or rollers 318 can tension the free end 110 to prevent a user from dispensing more than one protective bag 2 at a time. The guides or rollers 318 and/or spindle 319 can include friction interfaces to prevent a user from spinning the roll 102 about the spindle 319.

The housing 304 can include a hinge 344. The hinge 344 can facilitate opening of one or more of the panels of the housing 304. As illustrated, the top panel 305 and the second side panel 307 are coupled together and mounted on the hinge 344. Rotation about the hinge 344 can open and close the housing 304 for installation and removal of the roll 102. The second side panel 307 can include a locking mechanism or aperture 307A for grasping the second side panel 307 for opening purposes.

The front panel 303 can include the slot 310. The slot 310 can be located a distance 326 above the bottom panel 308 and/or a shelf 320. The slot 310 can include a height 316. The height 316 can have dimensions equivalent to the dimensions given for the widened portion 214 of the slot 210 in FIG. 3. The slot 310 can have a width 315. The width 315 can be greater than or equal to the width 11 of the protective bag 2. In some implementations, the shelf 320 can be at the level of the bottom panel 308. The distance 326 can be equal to or greater than the length 10 of the protective bag 2. The shelf 320 can have a lip 322. The shelf 320 can have a width 324. The width 324 can have the same dimensions as noted above for the shelf 220 in FIG. 3. As shown, the shelf 320 can include one or more friction slots 323. Friction slots 323 can facilitate tearing along the perforation line 104 between the protective bag 2 and the adjacent protective bag 2A.

Figure 8:
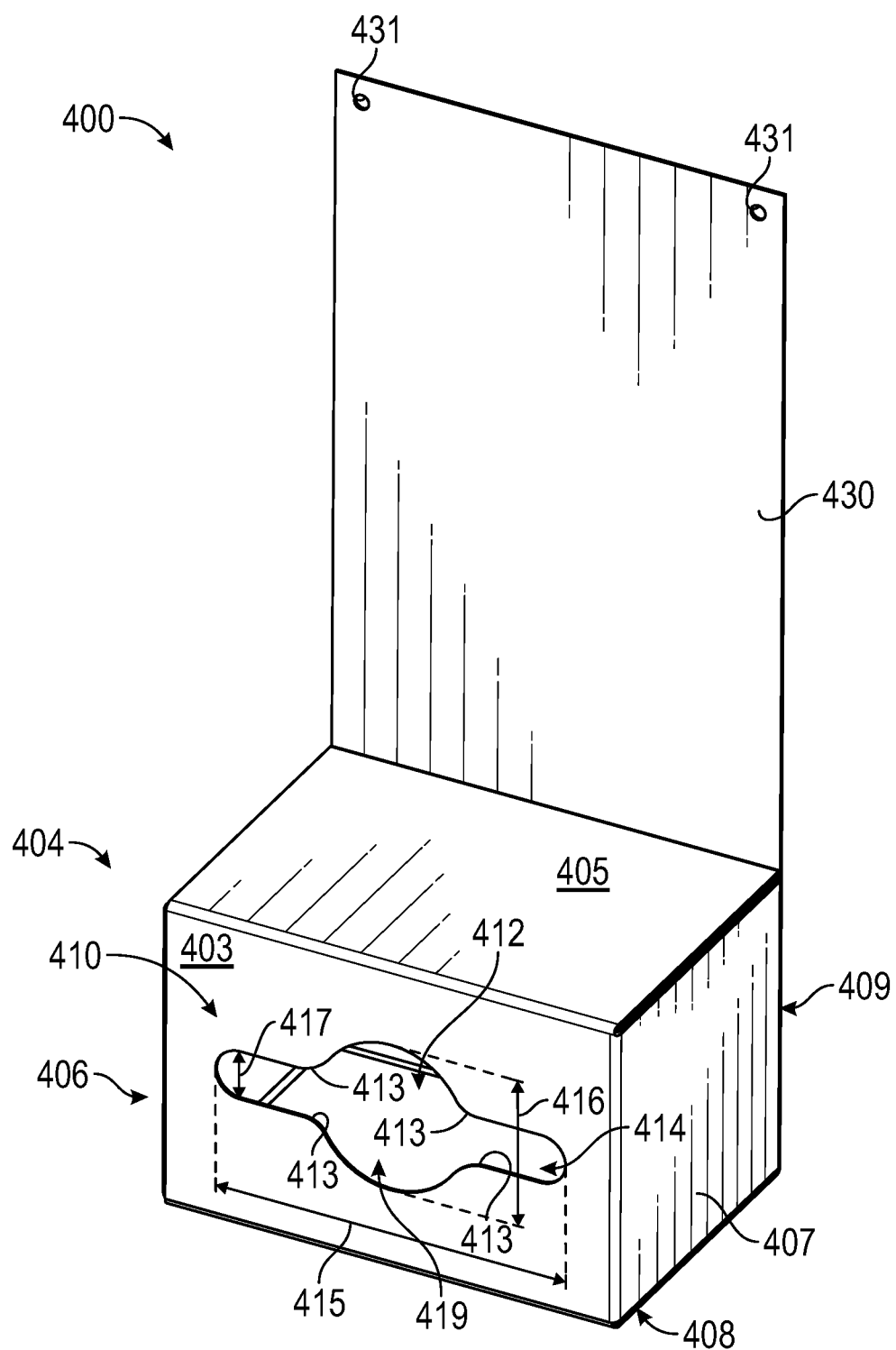
FIG. 8 shows a front perspective view of another preferred embodiment of a dispensing system.
Figure 9:
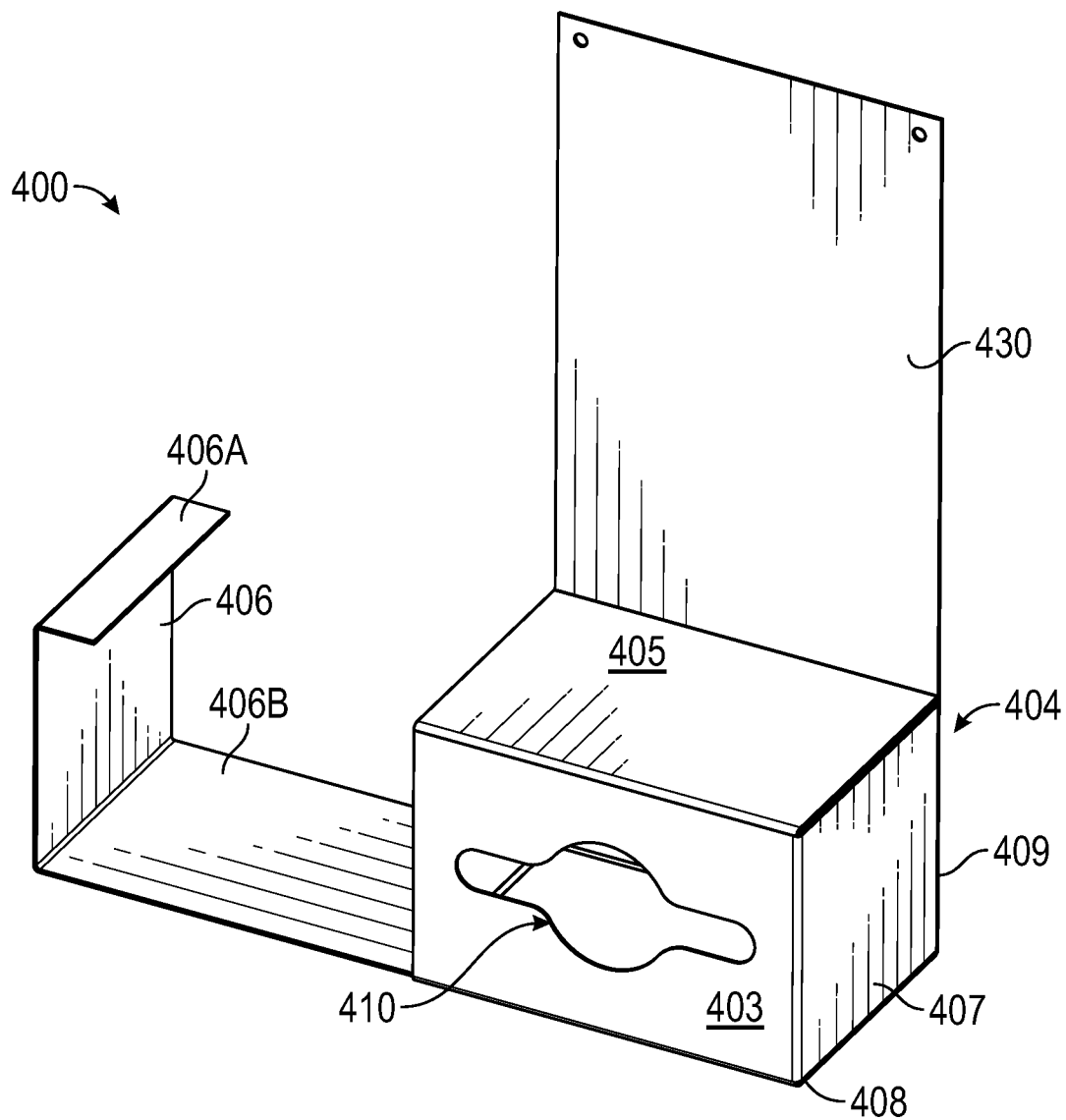
FIG. 9 shows the dispensing system of FIG. 8 in an open configuration.

FIGS. 8 and 9 show another embodiment of a dispenser 400 similar to the dispensers 200 and 300 described above. The dispenser 400 can be used for dispensing the roll 102 and/or a plurality of stacked protective bags 2. The dispenser 400 can include a housing 404. The housing 404 can be generally rectangularly shaped. The housing 404 can include an upper panel 405, a front panel 403, a bottom panel 408, a first side panel 406, second side panel 407, and/or a rear panel 409. Any of the panels of the housing 404 can be openable or removable for loading the protective bags within the enclosure formed by the housing 404. The housing 404 can include an internal shelf or spindle for supporting the protective bags 2 in the roll 102.

The housing 404 can further include an upright portion 430. The upright portion 430 can facilitate mounting the dispenser 400. The upright portion 430 can be a generally planar portion extending above the top panel 405. The upright portion 430 can include one or more mounting locations 431. The mounting locations can be apertures for receiving a screw or other mechanical fastener. In certain implementations, the upright portion 430 can include space for branding and/or instructional information for using the dispenser 400. The top panel 405 can be sized to allow the mobile device 1 to be laid on the top panel. The top panel 405 can have at least one dimension greater than the length 11 or width 10 of the mobile device 1.

The dispenser 400 can include a slot 410. The slot 410 can be included on any of the panels of the housing 404. In particular, the slot 410 can be on the front panel 403. The slot 410 can be shaped like the slot 210 and/or the slot 310 described above. The slot 410 can also include a widened portion 414 and one or more lateral portions 412, 419. The widened portion 414 can have a width 415. The width 415 can correspond or be equal to or greater than the width 11 of the protective bag 2. The width 415 can have the dimensions as noted above for the widened portion width 215. The widened portion 414 can have a height 417. The height 417 can have the dimensions given for the height 217 given for the widened portion 214 noted above. The slot 410 can have a height 416. The height 416 can have dimensions as given above for the slot 210, in particular the height 216.

The slot 410 can include the lateral portion 412. The lateral portion 412 can be a generally arced portion that intersects and combines with the widened portion 414. The lateral portion 412 can intersect with the widened portion 414 at one or more corners 413. The corners 413 an function similar to the corners 213 noted above. Specifically, the corners 413 and the lateral portion 412 can facilitate retrieval of the free end 110 on the roll and/or the opening of the opening 3 of protective bag 2 by separation of the front layer 8 from the rear layer 9.

The slot 410 can also include the lateral portion 419. The lateral portion 419 can be disposed on an opposite side of the widened portion 414 from the lateral portion 412. The lateral portion 419 can have the same dimensions and/or shape as the lateral portion 412. Advantageously having one or both of the lateral portions 412, 419 can improve the ergonomics of the dispenser 400. Having one or both of the lateral portions 412, 419 can allow a user to more easily grasp the free end 110 of the roll or otherwise grasp the protective bag 2 to retrieve it from within the housing 404.

The dispenser 400 can include a shelf similar to the shelf 220 and/or the shelf 320. The shelf 220 can be located at the bottom panel 408, below the bottom panel 408, at the top panel 405 and/or other locations on the housing 404. Advantageously, the shelf can be spaced below the slot 410 at a distance approximately equivalent or greater than the length 10 of the protective bags 2 contained within the housing 404.

FIG. 9 shows the housing 404 in an open configuration. The housing 404 can include a removable tray. The removable tray can be formed from any of the panels of the housing 404. As shown, the removable tray is formed from the first side panel 406 in conjunction with one or more adjacently coupled panels, such as the upper flange 406A and bottom flange 406B. The removable tray can be slideable within the housing 404. The removable tray can include the upper flange 406A and the bottom flange 406B. The upper flange 406A can extend generally along the top panel 405. The bottom flange 406B can extend generally along the bottom panel 408. In certain implementations, the removable tray can include a locking mechanism for securing the contents of the housing 404.

Figure 10:
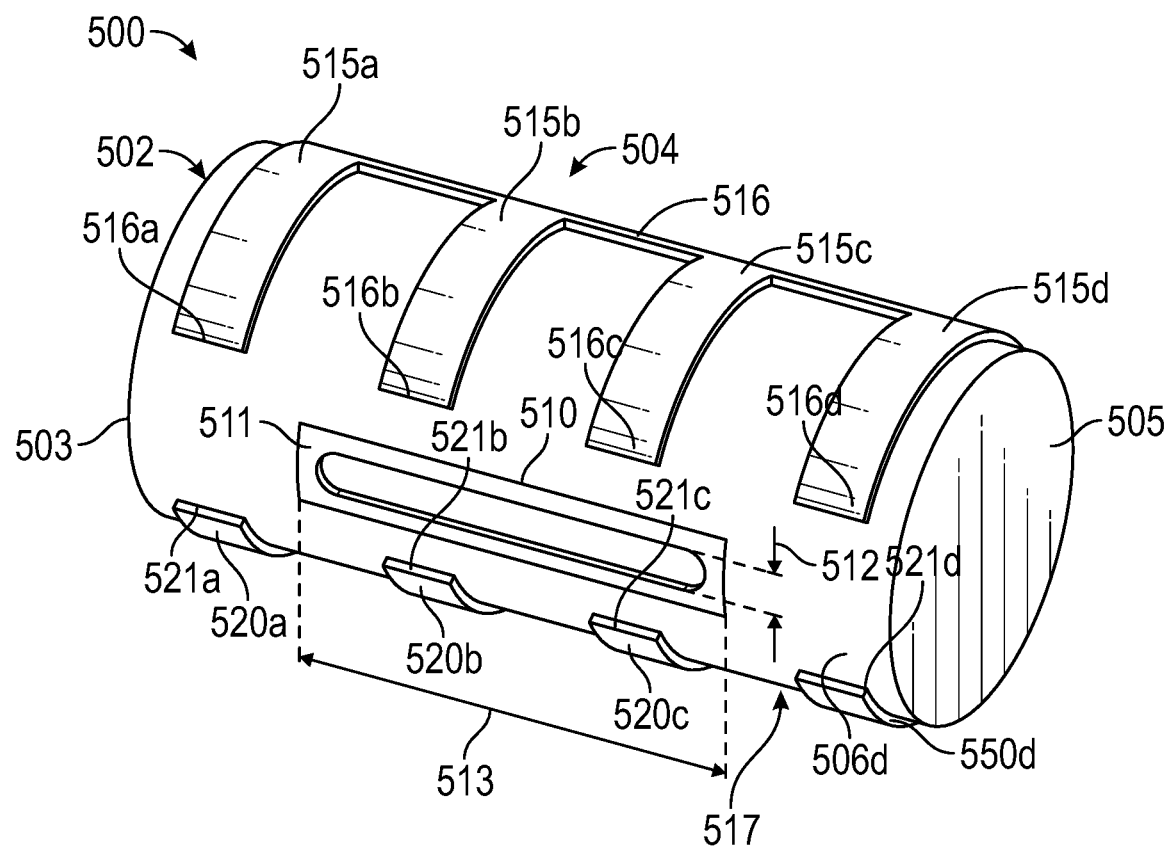
FIG. 10 shows a front perspective view of another preferred embodiment of a dispensing system.

FIG. 10 shows another embodiment of the dispenser 500. The dispenser 500 can stand alone or include any of the elements given above for the dispensers 200, 300, and/or 400. For example, the dispenser 500 can be used in conjunction with a shelf such as the shelf 220, 320, or other shelf. The dispenser 500 can comprise a mount 504 and a receptacle 502. The receptacle 502 can be a generally enclosed container for containing the roll 102 and/or a plurality of the dispenser bags 2. In certain implementations, the container 502 can be formed out of any suitable material. The container 502 can be formed out of any of the materials listed above for the dispenser 200, any of the other dispensers, and/or the protective bag 2. For example, cardboard or other wood pulp product.

The container 502 can be shaped in any of several form factors. The container 502 can be generally cylindrically shaped. The casing 502 can have one or more capped ends 503, 505. The capped ends 503, 505 can couple with a generally curved surface 506 extending between the capped ends 503, 505 in the form of a cylinder. The container 502 can be disposable. In certain implementations, the container 502 is not serviceable by a user (e.g., for replacement of the bags contained therein). Accordingly, it is necessary to purchase a new container 502 for fitting within the mount 504.

The container 502 can include a slot 510. The slot 510 can have any of the shapes described for the slots 210, 310, 410 described above. The slot 510 can have a width 513. The width 513 can have dimensions such as those described in relation to the width 215 described above. The slot 510 can include a height 512. The height 512 can have any of the dimensions described above for the height 217 described above. In certain implementations, the slot 510 can be covered by a material 511. The material can be removed to expose the protective bags 2 within the casing 502. For example, the protective layer 511 can be an adhesive plastic that covers the slot 510.

The mount 504 can engage with and/or contain the container 502. The mount 504 can include an upper housing member 516 and a lower housing member 517. The upper housing member 516 can comprise a plurality of extensions 515 (e.g., 515a, 515b, 515c, 515d). The plurality of extensions 515 can be shaped to engage with the outer surface 506 of the container 502. The plurality of extensions 515 can have tips 516 (e.g., 516a, 516b, 516c, 516d). The extensions 515 can be generally curved to engage with the curved surface of the outer surface 506. The curvature of the extensions 515 can be greater than or equal to the curvature of the surface 506 to provide engagement of the extensions 515 with the curved surface 506. This can facilitate maintaining the container 502 in a specific orientation within the mount 504. The other implementations there can be one or more alignment notches and apertures between the container 502 and the mount 504. The second housing member 517 can have the same structure as the first housing member 516 such as but not limited to the extensions 520 having tips 521 (e.g., 521a, 521b, 521c, 521d).

Figure 11:
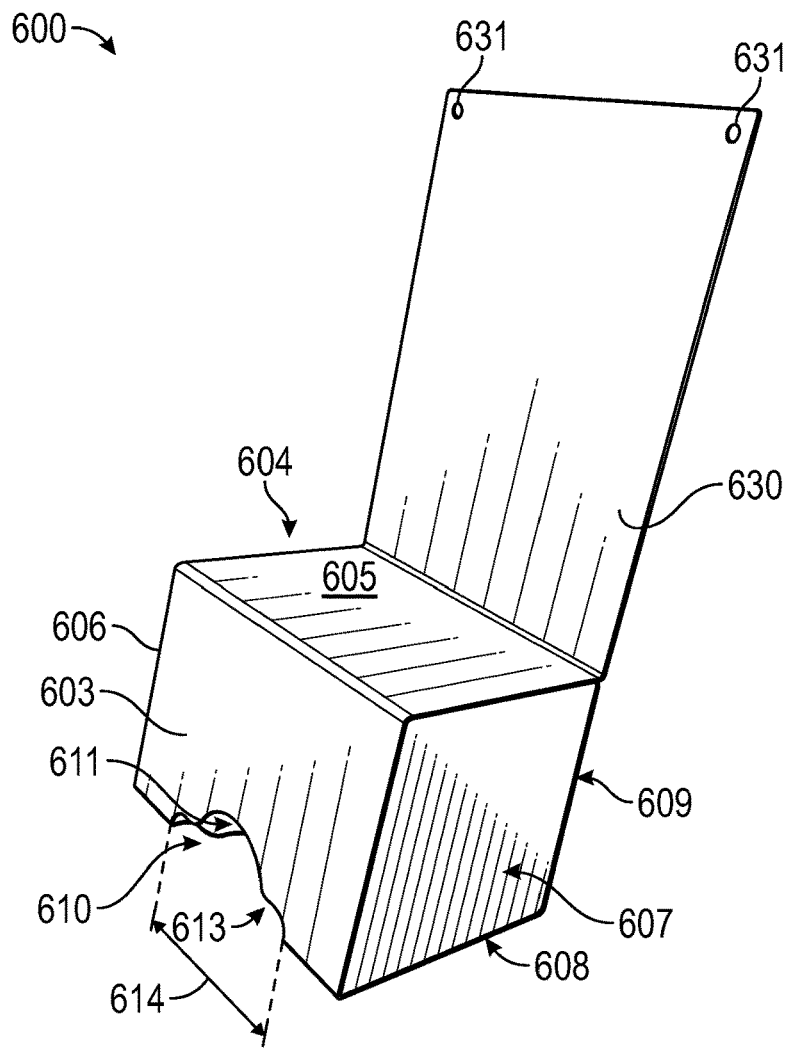
FIG. 11 shows a front perspective view of another preferred embodiment of a dispensing system.
Figure 12:
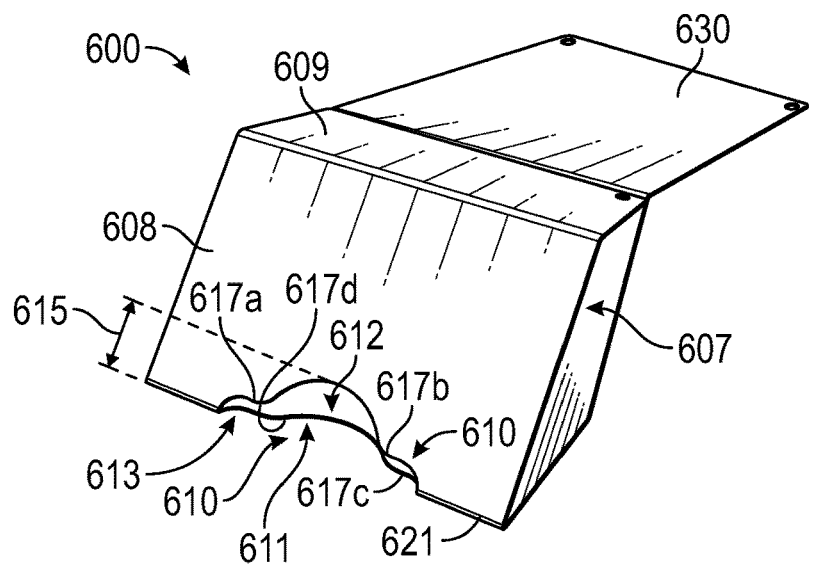
FIG. 12 shows a bottom perspective view of the dispensing system of FIG. 11.
Figure 13:
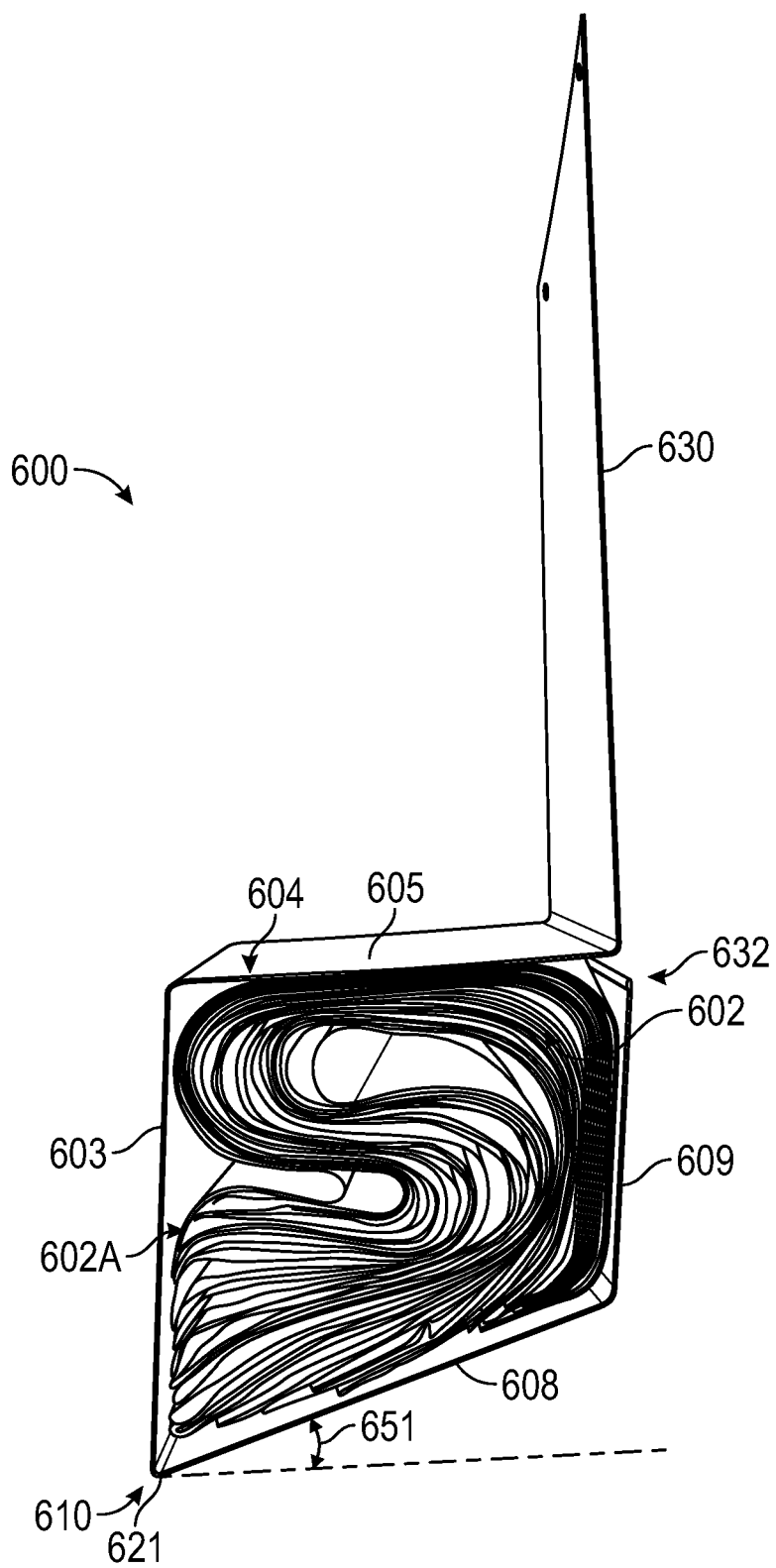
FIG. 13 shows a side elevation view of the dispensing system of FIG. 12 containing a plurality of protective bags.

FIGS. 11-13 show another embodiment of a dispenser 600 similar to the dispensers described above. The dispenser 600 can have a housing 604. The housing 604 can contain protective bags arrange as a plurality of stacked protective bags 602 or as a roll of protective bags. The protective bag 602 can have any of the dimensions and features noted above for the protective bag 2. The housing 604 can be generally rectangular shaped. The housing 604 can include a front panel 603, top panel 605, bottom panel 608, first side panel 606, second side panel 607 and/or back panel 609. The housing 604 can have an upright portion 630. The upright portion 630 can extend above the top panel 605. The upright portion 630 can include mounting apertures 631. The upright portion 630 can facilitate mounting and/or instructions or branding thereon. The housing 604 can include a slot 632 to aid in loading the plurality of protective bags 602.

The housing 604 can include a slot 610. The slot 610 can be located on an edge 621. The edge 621 can be between any of the panels of the housing 604. The edge 621 is located between the front panel 603 and the bottom panel 608. The slot 610 can include a height 615 on each of the panels of the edge 621. The slot 611 can include a first lateral portion 611 and a second lateral portion 612. The first and second lateral portion 611, 612 can be located on opposite sides of the widened portions 613. The slot 610 can include a width 614. The width 614 can have any of the dimensions mentioned above for the widened portion 214 of the slot 210. The first lateral portion 611 can be located on the front panel 603. The second lateral portion 612 can be located on the bottom panel 608. Thus, the slot 610 can span the edge 621.

The slot 610 can also include a plurality of corners 617. The corners 617 (e.g., 617a, 617b, 617c, 617d) can be interfaces of the lateral portion 611, 612 with the widened portion 613. The corners 617 function to prevent removal of more than one protective bag 602 by frictional engagement with the other bags adjacent the slot 610.

As shown in FIG. 13, the front panel 603 may not be perpendicular with the bottom panel 608. An angle 651 between the front panel 603 and the bottom panel 608 can be less than 90°. The angle 651 can facilitate feeding one end of the plurality of protective bags 602 contained within the housing 604 towards the edge 621. The angle 651 can be between 5° and 60° angle with respect to horizontal.

The angled bottom panel 608 and/or the placement of the slot 610 on the edge 621 can facilitate feeding one end 602A of the plurality of protective bags 602 towards the slot 610. This configuration provides substantial advantage over placing the slot on a center portion of any of the panels of the housing 604, such as the front panel 603. The slot 610 on the edge 612 allows the user to grasp through the slot 610 from above or below the housing 604 and still easily grasp one of the stacked protective bags. This is particularly advantageous where there is a stack of protective bags 602 because a user can inadvertently grab more than one bag. Having a larger slot 610 (e.g. with the lateral portions 611, 612) facilitates grasping a particular protective bag. It also provides more space for a user to grasp a bag located either on the top of the stack of protective bags 602 and/or from the bottom of the stack of protective bags 602.

Though the above detailed description has shown, described, and pointed out novel features of the development as applied to various embodiments, it will be understood that various omissions, substitutions, and changes in the form and details of the devices illustrated may be made by those skilled in the art without departing from the spirit of the development. As will be recognized, the present development may be embodied within a form that does not provide all of the features and benefits set forth herein, as some features may be used or practiced separately from others. All changes which come within the meaning and range of equivalency of the claims are to be embraced within their scope.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The term "comprising" as used herein is synonymous with "including," "containing," or "characterized by," and is inclusive or open-ended and does not exclude additional, unrecited elements or method steps.

The above description discloses several methods of manufacture and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it cover all modifications and alternatives coming within the true scope and spirit of the development as embodied in the attached claims.

Though the above detailed description has shown, described, and pointed out novel features of the improvements as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A dispenser system for dispensing a protective bag for a mobile device, the dispenser system comprising:
   a cylindrical container including a plurality of protective bags and a slot for dispensing the plurality of protective bags; and
   a first mounting portion and a second mounting portion, each of the mounting portions including a plurality of extensions, each extension of the plurality of extensions being sized to engage with the cylindrical container to support the cylindrical container between the first and second mounting portions, the slot being oriented to be exposed between the pluralities of extensions.

2. The system of claim 1, wherein there are five extensions on each of the first and second mounting portions.

3. The system of claim 1, further comprising one or more tabs for maintaining alignment of the cylindrical container with the first and mounting portions.

4. The system of claim 1, wherein the cylindrical container is disposable.

5. The system of claim 1, wherein the dispenser housing is configured to dispense a roll of protective bags.

6. The system of claim 1, further comprising the protective bag, wherein the protective bag comprises one or more perforations.

7. The system of claim 1, further comprising the protective bag, wherein the protective bag is transparent.

8. The system of claim 1, further comprising the protective bag, wherein the protective bag is biodegradable.

9. The system of claim 1, further comprising the protective bag, wherein the protective bag is opaque.

10. The system of claim 1, further comprising the protective bag, wherein the protective bag is made of at least one of a plastic or other polymer, a natural or synthetic fiber or fabric, paper or wood pulp product, contains metallic or metallic-like materials, contains glass or glass-like materials.

11. The system of claim 1, wherein the dispenser housing is configured to dispense a stack of protective bags.

12. A dispenser system for dispensing a protective bag for a mobile device, the dispenser system comprising:
   a cylindrical container having a curved outer surface and a slot, the cylindrical container being configured to support a plurality of protective bags, the slot being configured to allow a user to access at least one of the plurality of protective bags; and
   a plurality of extension being sized and shaped to engage with the curved outer surface so as to support the cylindrical container therebetween.

* * * * *